US012621176B2

(12) United States Patent
Won et al.

(10) Patent No.: US 12,621,176 B2
(45) Date of Patent: May 5, 2026

(54) ELECTRONIC DEVICE HAVING PARTIAL LEDGER IN BLOCKCHAIN NETWORK AND OPERATION METHOD THEREOF

(71) Applicant: Samsung Electronics Co., Ltd., Suwon-si (KR)

(72) Inventors: Sungwook Won, Suwon-si (KR); Woongah Yoon, Suwon-si (KR); Seungmin Ha, Suwon-si (KR); Jinsu Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 18/301,633

(22) Filed: Apr. 17, 2023

(65) Prior Publication Data

US 2023/0261888 A1      Aug. 17, 2023

Related U.S. Application Data

(63) Continuation of application No. PCT/KR2022/008313, filed on Jun. 13, 2022.

(30) Foreign Application Priority Data

Jun. 11, 2021   (KR) ........................ 10-2021-0075917
Aug. 12, 2021   (KR) ........................ 10-2021-0106777

(51) Int. Cl.
*H04L 9/00*          (2022.01)
(52) U.S. Cl.
CPC ...................................... *H04L 9/50* (2022.05)
(58) Field of Classification Search
None
See application file for complete search history.

(56) References Cited

U.S. PATENT DOCUMENTS

| | | | | |
|---|---|---|---|---|
| 10,671,515 | B1 * | 6/2020 | Sanghvi | .............. G06F 11/3684 |
| 10,749,668 | B2 | 8/2020 | Yanagisawa | |

(Continued)

FOREIGN PATENT DOCUMENTS

| | | |
|---|---|---|
| KR | 10-2018-0074655 A | 7/2018 |
| KR | 10-1936757 B1 | 1/2019 |

(Continued)

OTHER PUBLICATIONS

International Search Report with English translation dated Sep. 16, 2022; International Appln. No. PCT/KR2022/008313.

(Continued)

*Primary Examiner* — Hasanul Mobin
(74) *Attorney, Agent, or Firm* — Jefferson IP Law, LLP

(57) ABSTRACT

An electronic device constituting a blockchain node included in a blockchain network is provided. The electronic device includes a communication circuit configured to at least one of transmit a signal to or receive another signal from one or more external devices, a memory configured to store a partial ledger including a part of an entire ledger for the blockchain network, the partial ledger including at least one block corresponding to respective at least one transaction in which the electronic device has participated in a consensus, and at least one processor electrically connected to the communication circuit and the memory, wherein the at least one processor is configured to execute a transaction related to the electronic device, according to the execution of the transaction, generate a block which includes block data for the transaction, and a hash field including previous block information in the entire ledger and previous block information in the partial ledger, and to store the block in the memory in association with the partial ledger.

20 Claims, 12 Drawing Sheets

(56) References Cited

U.S. PATENT DOCUMENTS

| | | | |
|---|---|---|---|
| 11,088,825 | B2 | 8/2021 | Holmberg et al. |
| 11,194,770 | B2 * | 12/2021 | Irazabal ............... G06F 16/1834 |
| 11,461,777 | B2 | 10/2022 | Wu et al. |
| 2019/0096522 | A1 * | 3/2019 | Scriber ................. H04L 9/3247 |
| 2019/0188698 | A1 * | 6/2019 | Wu ....................... G06Q 20/401 |
| 2019/0188711 | A1 | 6/2019 | Wu et al. |
| 2019/0220831 | A1 * | 7/2019 | Rangarajan ........... H04L 9/3239 |
| 2019/0303621 | A1 | 10/2019 | Baset et al. |
| 2020/0073962 | A1 * | 3/2020 | Natarajan ............. H04L 9/0643 |
| 2020/0117825 | A1 * | 4/2020 | Vaswani ................... H04L 9/50 |
| 2020/0195441 | A1 * | 6/2020 | Suen .................... G06F 16/1805 |
| 2020/0304288 | A1 | 9/2020 | Schwartz et al. |
| 2020/0349123 | A1 | 11/2020 | Irazabal |
| 2020/0356969 | A1 * | 11/2020 | Cho ..................... G06Q 20/145 |
| 2020/0387501 | A1 * | 12/2020 | Ford ................... G06F 16/2246 |
| 2021/0091924 | A1 | 3/2021 | Holmberg et al. |
| 2021/0091957 | A1 | 3/2021 | Ford |
| 2021/0264520 | A1 * | 8/2021 | Cummings ............ G06Q 40/04 |
| 2023/0261888 | A1 * | 8/2023 | Won ........................ H04L 63/12 |
| | | | 713/168 |

FOREIGN PATENT DOCUMENTS

| | | | |
|---|---|---|---|
| KR | 10-1941786 | B1 | 1/2019 |
| KR | 10-2017739 | B1 | 9/2019 |
| KR | 10-2019-0113210 | A | 10/2019 |
| KR | 10-2019-0122843 | A | 10/2019 |
| KR | 10-2020-0004444 | A | 1/2020 |
| KR | 10-2111544 | B1 | 5/2020 |
| KR | 10-2020-0085565 | A | 7/2020 |
| KR | 10-2020-0097147 | A | 8/2020 |
| KR | 10-2020-0100773 | A | 8/2020 |
| KR | 10-2181098 | B1 | 11/2020 |
| KR | 10-2021-0024992 | A | 3/2021 |
| WO | 2019/211225 | A1 | 11/2019 |

OTHER PUBLICATIONS

Extended European Search Report dated Sep. 13, 2024; European Appln. No. 22820627.2-1218 / 4307645 PCT/KR2022008313.
Korean Office Action dated Sep. 10, 2025, issued in Korean Patent Application No. 10-2021-0106777.

* cited by examiner

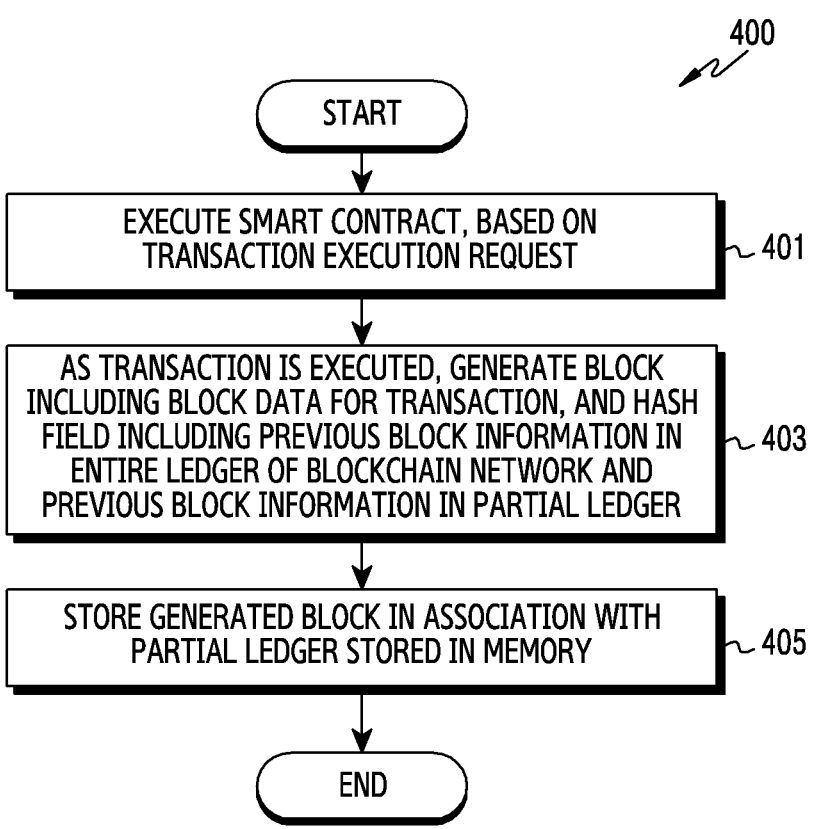

400

START

EXECUTE SMART CONTRACT, BASED ON
TRANSACTION EXECUTION REQUEST ~ 401

AS TRANSACTION IS EXECUTED, GENERATE BLOCK
INCLUDING BLOCK DATA FOR TRANSACTION, AND HASH
FIELD INCLUDING PREVIOUS BLOCK INFORMATION IN
ENTIRE LEDGER OF BLOCKCHAIN NETWORK AND
PREVIOUS BLOCK INFORMATION IN PARTIAL LEDGER ~ 403

STORE GENERATED BLOCK IN ASSOCIATION WITH
PARTIAL LEDGER STORED IN MEMORY ~ 405

END

FIG.4

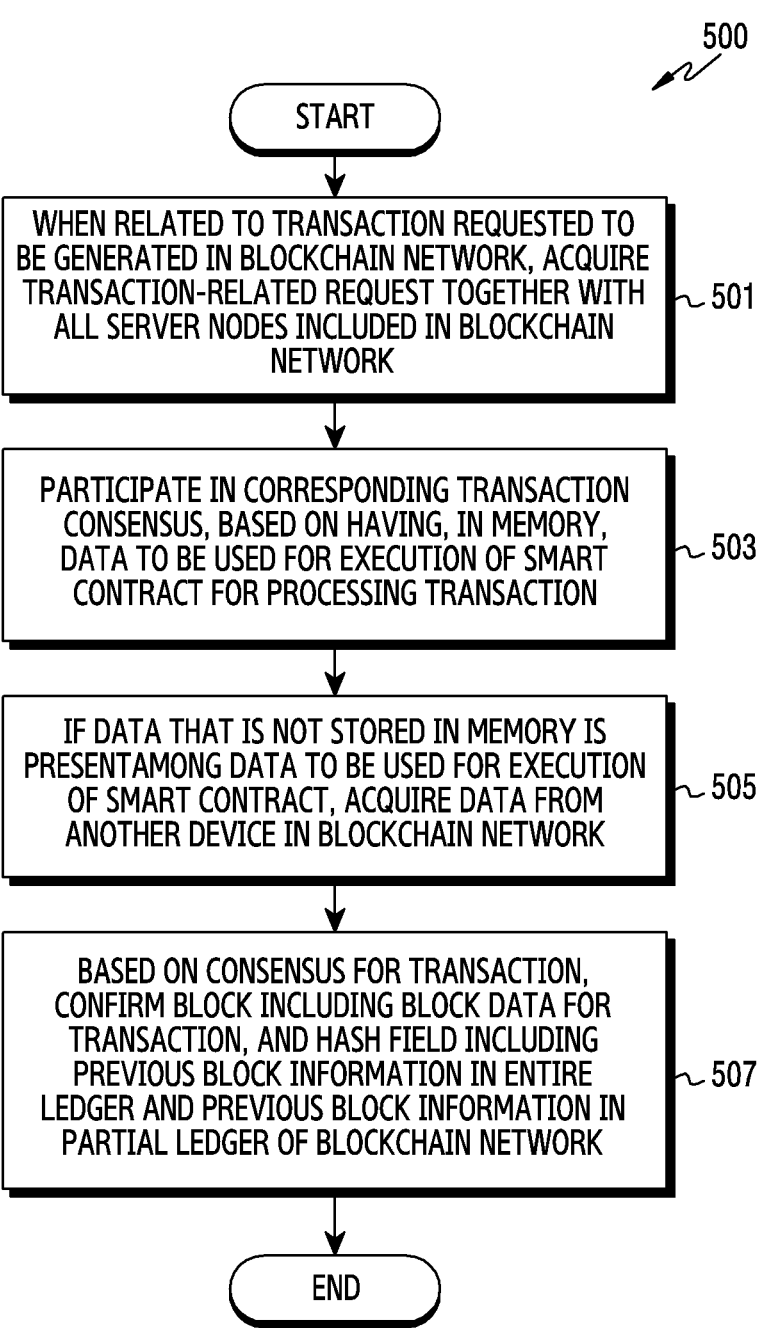

START

WHEN RELATED TO TRANSACTION REQUESTED TO BE GENERATED IN BLOCKCHAIN NETWORK, ACQUIRE TRANSACTION-RELATED REQUEST TOGETHER WITH ALL SERVER NODES INCLUDED IN BLOCKCHAIN NETWORK ~ 501

PARTICIPATE IN CORRESPONDING TRANSACTION CONSENSUS, BASED ON HAVING, IN MEMORY, DATA TO BE USED FOR EXECUTION OF SMART CONTRACT FOR PROCESSING TRANSACTION ~ 503

IF DATA THAT IS NOT STORED IN MEMORY IS PRESENTAMONG DATA TO BE USED FOR EXECUTION OF SMART CONTRACT, ACQUIRE DATA FROM ANOTHER DEVICE IN BLOCKCHAIN NETWORK ~ 505

BASED ON CONSENSUS FOR TRANSACTION, CONFIRM BLOCK INCLUDING BLOCK DATA FOR TRANSACTION, AND HASH FIELD INCLUDING PREVIOUS BLOCK INFORMATION IN ENTIRE LEDGER AND PREVIOUS BLOCK INFORMATION IN PARTIAL LEDGER OF BLOCKCHAIN NETWORK ~ 507

END

ELECTRONIC DEVICE HAVING PARTIAL LEDGER IN BLOCKCHAIN NETWORK AND OPERATION METHOD THEREOF

CROSS-REFERENCE TO RELATED APPLICATION(S)

This application is a continuation application, claiming priority under § 365(c), of an International application No. PCT/KR2022/008313, filed on Jun. 13, 2022, which is based on and claims the benefit of a Korean patent application number 10-2021-0075917, filed on Jun. 11, 2021, in the Korean Intellectual Property Office, and of a Korean patent application number 10-2021-0106777, filed on Aug. 12, 2021, in the Korean Intellectual Property Office, the disclosure of each of which is incorporated by reference herein in its entirety.

TECHNICAL FIELD

The disclosure relates to an electronic device for controlling execution of a function by using a blockchain network and a method performed by the electronic device. More particularly, the disclosure relates to an electronic device for controlling execution of a function by using a blockchain network including blockchain nodes having a partial ledger, and a method performed by the electronic device.

BACKGROUND ART

A blockchain network is a network differentiated from a centralized network in which decision-making is performed by a central server, and is expressed as a decentralized network. A blockchain network may refer to a network in which decision-making is performed according to a consensus algorithm of nodes participating in a blockchain network.

A distributed ledger existing in a blockchain network may include at least one block generated based on a transaction executed in the blockchain network and a database that stores data related to the transaction. A distributed ledger may be stored in each node participating in a blockchain network. A distributed ledger existing in a blockchain network may be updated according to a consensus algorithm of nodes participating in the blockchain network. A distributed ledger may include at least one block by connection of the same. The block connection may be expressed as a blockchain.

The above information is presented as background information only to assist with an understanding of the disclosure. No determination has been made, and no assertion is made, as to whether any of the above might be applicable as prior art with regard to the disclosure.

DISCLOSURE

Technical Problem

A blockchain network may include blockchain nodes that make a blockchain system valid. Blockchain nodes may include electronic devices.

Nodes participating in a blockchain network store and maintain data for the entire blockchain on electronic devices for the integrity of a block. A case in which data for the entire blockchain is not large is not a problem, but as the number of blocks increases, the size of the data for the entire blockchain gradually increases. Therefore, there is a problem in that nodes participating in a blockchain store, maintain, and manage a large amount of data. If a node participating in a blockchain is a personal mobile device, there is a problem that this level of performance cannot be achieved.

Nodes participating in a blockchain network participate in a consensus operation for transactions performed in the blockchain network. Nodes participating in a blockchain network participate in a consensus even though transactions are not related to the nodes themselves. Therefore, since central processing unit (CPU) processing and blockchain network communication should be maintained, there is a problem that each blockchain node continuously consumes power. In addition, since random communication is performed with other nodes included in a blockchain network, a security problem may occur.

Aspects of the disclosure are to address at least the above-mentioned problems and/or disadvantages and to provide at least the advantages described below.

Technical Solution

In accordance with an aspect of the disclosure, an electronic device constituting a blockchain node of a blockchain network is provided. The electronic device includes a communication circuit configured to at least one of transmit a signal to or receive another signal from one or more external devices, a memory configured to store a partial ledger including a part of an entire ledger for the blockchain network, the partial ledger including at least one block corresponding to respective at least one transaction in which the electronic device has participated in a consensus, and at least one processor electrically connected to the communication circuit and the memory, wherein the at least one processor is configured to execute a transaction related to the electronic device, according to the execution of the transaction, generate a block which includes block data for the transaction, and a hash field including previous block information in the entire ledger and previous block information in the partial ledger, and to store the block in the memory in association with the partial ledger.

In accordance with another aspect of the disclosure, a method performed by an electronic device constituting a blockchain node of a blockchain network is provided. The method includes executing a transaction related to the electronic device, according to the executing of the transaction generating a block which includes block data for the transaction, and a hash field including previous block information in an entire ledger and previous block information in a partial ledger with respect to the blockchain network, and storing the block in a memory of the electronic device in association with the partial ledger, wherein the partial ledger includes a part of the entire ledger for the blockchain network, and wherein the partial ledger includes at least one block corresponding to respective at least one transaction in which the electronic device has participated in a consensus.

In accordance with yet another aspect of the disclosure, a blockchain system is provided. The blockchain system includes a first electronic device as a blockchain node, and a second electronic device as another blockchain node wherein the first electronic device may include a first memory configured to store a partial ledger including a part of the entire ledger for the blockchain system, wherein the second electronic device may include a second memory configured to store the entire ledger for the blockchain system, wherein the entire ledger may include at least one block generated according to execution of at least one transaction in the blockchain system, wherein the partial ledger may include at least a part of the entire ledger, and wherein each of the at least one block may include block data for a transaction, and a hash field including previous block information in the entire ledger and previous block information in the partial ledger.

Advantageous Effects

According to the disclosure, an electronic device can establish a blockchain network with external electronic devices. The electronic device can store a partial ledger including at least a part of a distributed ledger of the blockchain network.

The electronic device according to the disclosure can store a partial ledger in a memory, and can efficiently use the memory when the partial ledger is stored.

The electronic device according to the disclosure can efficiently use the memory by storing only data related to a transaction in which the electronic device participates in a consensus.

The electronic device according to the disclosure can secure, even if a partial ledger including at least a part of a distributed ledger of the blockchain network is stored, the reliability and integrity of blocks included in the partial ledger.

The electronic device according to the disclosure may participate in a transaction consensus, with only a partial ledger. As a blockchain node, the electronic device can store a partial ledger while maintaining the same level of consensus authentication as that of a general blockchain.

The electronic device according to the disclosure can, by participating in processing of a transaction related to the electronic device, reduce unnecessary power consumption and reduce randomly generated communication with other electronic devices.

The electronic device according to the disclosure can address a security problem, by participating in processing only a transaction related to the electronic device in the blockchain network.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 4 is a flowchart illustrating an operation of adding a block to a partial ledger by the electronic device according to an embodiment of the disclosure;

FIG. 5 is a flowchart illustrating an operation of confirming a block via a consensus with nodes included in a blockchain network by the electronic device according to an embodiment of the disclosure;

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
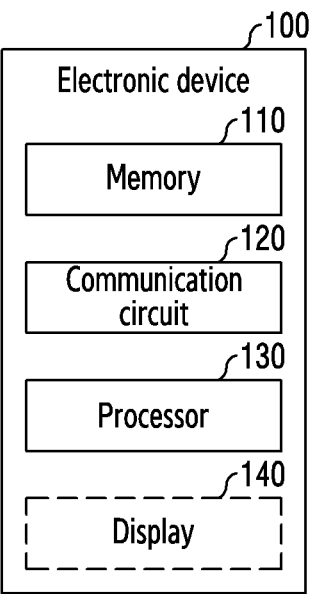
FIG. 1 is a block diagram of an electronic device according to an embodiment of the disclosure.

FIG. 1 is a block diagram of an electronic device according to an embodiment of the disclosure.

Referring to FIG. 1, an electronic device 100 may include a memory 110, a communication circuit 120, a processor 130, and a display 140, or a combination thereof. In various embodiments, the electronic device 100 may include an additional element in addition to the elements illustrated in FIG. 1, or may omit at least one of the elements illustrated in FIG. 1.

According to an embodiment, the memory 110 may store instructions causing, when executed, the processor 130 to control the elements of the electronic device 100 or process data so as to perform operations of the electronic device 100. The memory 110 may include a secure area or a separate secure storage medium (e.g., a secure memory area (e.g., a trust zone) accessible only via a secure operating system (OS)). According to an embodiment, the memory 110 may include at least one blockchain application that performs a blockchain-related operation. For example, a blockchain platform corresponding to a blockchain module or a blockchain application that performs a blockchain-related operation may be included.

According to an embodiment, the memory 110 may include a distributed ledger for a blockchain network. For example, if the electronic device 100 corresponds to a server node in the blockchain network, the memory 110 may store the entire distributed ledger for the blockchain network. Hereinafter, the entire distributed ledger is expressible as the entire ledger. For another example, if the electronic device 100 corresponds to a mobile node in the blockchain network, the memory 110 may store a partial ledger including a part of a distributed ledger for the blockchain network. Hereinafter, a part of the distributed ledger, which is distinguished from the entire ledger may be expressed as a partial ledger.

According to an embodiment, a distributed ledger may include a state database (state DB) and at least one block including respective at least one transaction in the blockchain network. Hereinafter, a state database is expressible as a state DB. According to an embodiment, the memory 110 may store a partial ledger including at least one block corresponding to each of at least one transaction in which the electronic device 100 participates in a consensus. The memory 110 may store, in a state database, data on at least one transaction in which the electronic device 100 participates in a consensus. Accordingly, the electronic device 100 may efficiently manage the memory 110 by storing, in the memory 110, only a block related to a transaction in which the electronic device 100 participates in a consensus.

According to an embodiment, the communication circuit 120 may be configured to be connected to an external device so as to transmit or receive data. For example, the communication circuit 120 may transmit data to or receive data from at least one external electronic device. According to an embodiment, the communication circuit 120 may communicate with various external servers. For example, the electronic device 100 may transmit data to an external server and receive a response from the external server, by using the communication circuit 120.

According to an embodiment, the electronic device 100 may establish a blockchain network with at least one external device via the communication circuit 120. According to an embodiment, the blockchain network may include, as blockchain nodes, at least one external device and the electronic device 100. Accordingly, the electronic device 100 and/or at least one external device may concurrently serve as nodes and clients. In an embodiment, the electronic device 100 may transmit data to or receive data from at least one external device included in the blockchain network via the communication circuit 120 and may participate in a transaction consensus in the blockchain network.

According to various embodiments, the blockchain network may include, as blockchain nodes, a server node and/or a mobile node. According to various embodiments, a server node and/or a mobile node are the electronic device 100 and/or an external electronic device, which may represent a portable electronic device. For example, the electronic device 100 and/or the external electronic device may correspond to a mobile device, a tablet personal computer (PC), and/or a notebook computer. A description of the blockchain network according to various embodiments will be described later with reference to FIG. 3.

According to an embodiment, the processor 130 may be electrically or operatively connected to the memory 110, the communication circuit 120, and the display 140. According to an embodiment, the processor 130 may execute an operation or data processing related to control and/or communication of at least one other element of the electronic device 100, by using instructions stored in the memory 110. According to an embodiment, the processor 130 may include at least one of a central processing unit (CPU), a graphics processing unit (GPU), a micro controller unit (MCU), a sensor hub, a supplementary processor, a communication processor, an application processor, an application-specific integrated circuit (ASIC), and field programmable gate arrays (FPGA), and may have multiple cores or processors.

According to an embodiment, the processor 130 may perform a blockchain-related operation via a blockchain platform stored in the memory 110. According to an embodiment, as a transaction is executed in the blockchain network, the processor 130 may generate a block including block data for the transaction and a hash field including previous block information in a partial ledger stored in the memory 110 and previous block information in the entire ledger in the blockchain network. The block may be confirmed via consensus with nodes included in the blockchain network via the communication circuit 120. In an embodiment, the processor 130 may store a block in the memory 110.

According to an embodiment, the display 140 may display various contents (e.g., text, an image, a video, an icon, and/or a symbol, etc.). According to an embodiment, the display 114 may include a liquid crystal display (LCD), a light emitting diode (LED) display, or an organic light emitting diode (OLED) display. According to an embodiment, the processor 130 may display various contents related to a blockchain application via the display 140.

As described above, the electronic device 100 constituting a blockchain node of a blockchain network according to an embodiment may include a communication circuit 120 configured to at least one of transmit a signal to or receive another signal from one or more external devices, a memory 110 configured to store a partial ledger including a part of an entire ledger for the blockchain network, the partial ledger including at least one block corresponding to respective at least one transaction in which the electronic device has participated in a consensus, and at least one processor 130 electrically connected to the communication circuit 120 and the memory 110, wherein the processor 130 is configured to execute a transaction related to the electronic device, according to the execution of the transaction, generate a block which includes block data for the transaction and a hash field including previous block information in the entire ledger and previous block information in the partial ledger, and to store the block in the memory 110 in association with the partial ledger.

According to an embodiment, the partial ledger may have a directed acyclic graph (DAG) structure, in which the at least one block is included as a node, respectively, and may include, as a root node, an initial block among the at least one block.

According to an embodiment, the processor 130 may execute a smart contract for the execution of the transaction, reach a consensus with at least one external device associated with the transaction from among one or more external devices respectively constituting blockchain nodes of the blockchain network, based on a consensus algorithm of the blockchain network, and may synchronize the block.

According to an embodiment, the memory 110 may include a state database for the blockchain network, and the state database may store state data related to the at least one transaction.

According to an embodiment, the processor 130 may determine whether data to be used for the execution of the transaction is stored in the state database, and may acquire, based on a result of the determination, the data to be used for the execution of the transaction from the at least one external device constituting a blockchain node in the blockchain network via the communication circuit.

According to an embodiment, the processor 130 may determine whether data to be used for the execution of the transaction is stored in the state database, and based on a result of the determination, when the data to be used for the execution of the transaction is acquired from each of multiple external devices via the communication circuit, the data may be acquired from each of the multiple external devices, based on a round robin manner.

According to an embodiment, the processor 130 may update the state database based on the execution of the transaction.

According to an embodiment, the hash field may further include information on the block, and the information on the block may include information based on a generation sequence of the block in the entire ledger.

As described above, a method performed by the electronic device 100 constituting a blockchain node of a blockchain network may include executing a transaction related to the electronic device 100, generating, according to the executing of the transaction, a block which includes block data for the transaction, and a hash field including previous block information in the entire ledger and previous block information in a partial ledger with respect to the blockchain network, and storing the block in the memory 110 of the electronic device in association with the partial ledger, wherein the partial ledger includes a part of the entire ledger for the blockchain network, and wherein the partial ledger includes at least one block corresponding to respective at least one transaction in which the electronic device has participated in a consensus.

According to an embodiment, the storing in the memory 110 may include storing in a DAG structure, in which the at least one block is included as a node, respectively, in association with the partial ledger, and the partial ledger may include, as a root node, an initial block among the at least one block.

According to an embodiment, the operation method of the electronic device 100 may further include executing a smart contract for the executing of the transaction, reaching a consensus with at least one external device associated with the transaction, based on a consensus algorithm of the blockchain network, from among at least one external device respectively constituting blockchain nodes in the blockchain network, and synchronizing the block.

According to an embodiment, the memory 110 may include a state database for the blockchain network, and wherein the operation method may further include storing state data related to the at least one transaction.

According to an embodiment, the operation method of the electronic device 100 may further include determining whether data to be used for the executing of the transaction is stored in the state database, and based on a result of the determination, acquiring data to be used for the executing of the transaction from at least one external device constituting a blockchain node in the blockchain network.

According to an embodiment, the method may further include updating the state database, based on the executing of the transaction.

According to an embodiment, the hash field may further include information on the block, and wherein the information on the block may include information based on a generation sequence of the block in the entire ledger.

As described above, in a blockchain system including a first electronic device as a blockchain node and a second electronic device as another blockchain node according to an embodiment, the first electronic device (e.g., the electronic device 100 of FIG. 1) may include a first memory (e.g., the memory 110 of FIG. 1) configured to store a partial ledger including a part of an entire ledger for the blockchain system, wherein the second electronic device (e.g., a third electronic device 330 of FIG. 3) may include a second memory configured to store the entire ledger for the blockchain system, wherein the entire ledger may include at least one block generated according to execution of at least one transaction in the blockchain system, wherein the partial ledger may include at least a part of the entire ledger, and wherein each of the at least one block may include block data for a transaction and a hash field including previous block information in the entire ledger and previous block information in the partial ledger.

According to an embodiment, the second electronic device may participate in a consensus for execution of all of the at least one transaction in the blockchain system, and wherein the first electronic device may participate in a consensus for execution of a transaction related to the first electronic device from among the at least one transaction.

According to an embodiment, the first memory of the first electronic device may include a first state database configured to store data for the transaction related to the first electronic device, and the second memory of the second electronic device may include a second state database configured to store data for all of the at least one transaction executed in the blockchain system.

According to an embodiment, the first electronic device may determine whether data to be used for the execution of the at least one transaction is stored in the first memory, and may acquire, based on a result of the determination, the data to be used for the execution of the at least one transaction, from the at least one external device included in the blockchain system.

According to an embodiment, the entire ledger has a DAG structure, in which the at least one block is included as a node, and may include, as a root node, an initial block of the blockchain system from among the at least one block.

Figure 2:
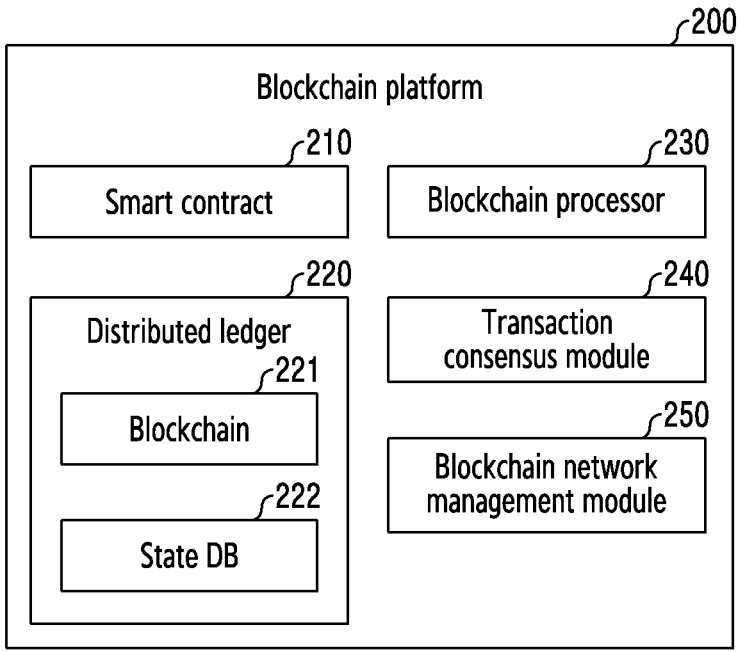
FIG. 2 is a diagram for illustrating a blockchain platform of the electronic device according to an embodiment of the disclosure.

FIG. 2 is a diagram for illustrating a blockchain platform of the electronic device according to an embodiment of the disclosure.

Referring to FIG. 2, the electronic device 100 may include a blockchain platform 200. According to an embodiment, the blockchain platform 200 may correspond to a blockchain application that performs a blockchain-related operation stored in the memory 110 or a blockchain module that performs a blockchain-related operation included in the processor 130.

According to an embodiment, the blockchain platform 200 may include a smart contract 210, a distributed ledger 220, a blockchain processor 230, a transaction consensus module 240, and a blockchain network management module 250. According to various embodiments, the blockchain platform 200 may further include various elements or omit some elements, to perform a blockchain-related operation.

According to an embodiment, the blockchain processor 230 may be included in the processor 130. The blockchain processor 230 may control operations of the elements included in the blockchain platform 200. For example, the blockchain processor 230 may perform transaction execution including ledger synchronization, transaction signing, and/or transaction recording on a blockchain network.

In an embodiment, the distributed ledger 220 may include a blockchain 221 and a state database (state DB) 222. According to an embodiment, the distributed ledger 220 may store data for a transaction related to the electronic device 100 in the blockchain network. For example, data and a block based on a transaction, in which the electronic device 100 participates in consensus processing, may be stored. According to an embodiment, the distributed ledger 220 may be a partial ledger including at least a part of the entire ledger, rather than the entire ledger of the blockchain network. For example, the distributed ledger may be a partial ledger including data and a block for a transaction related to the electronic device 100, in the entire ledger that stores data and blocks related to all transactions in the blockchain network.

According to an embodiment, the blockchain 221 may include at least one block generated via the blockchain network. A block may include a block header and transaction data. According to an embodiment, a block header may include a hash value of header and data areas, a hash value of a previous block, a block height value, a hash value of state data after performing a transaction included in a block, a public key of a block producer, a value obtained by signing a hash with a private key of the block producer, and at least one of a value obtained by signing a hash value with an attestation key or an attestation key certificate chain.

Block data may include a hash value of at least a part of transaction data, version information of a smart contract, a smart contract identifier (ID), a smart contract function ID, smart contract data that is an argument value used for a smart contract function, a nonce value that is a transaction generation number of a transaction generator, a public key of the transaction generator, a value obtained by signing a hash value with a private key of the transaction generator, and at least one of a value obtained by signing a hash value with an attestation key or an attestation key certificate chain.

In an embodiment, a block may include transactions containing information for execution of the smart contract 210. In an embodiment, blocks of the distributed ledger 220 may be in a form of the blockchain 221 and may include block data. For example, at least one block included in the blockchain 221 may include a hash field and block data. According to an embodiment, a hash field may include previous block information in the entire ledger of the blockchain network and previous block information in a partial ledger of the blockchain network. In an embodiment, block data may include transaction data for a corresponding block.

According to an embodiment, at least one block included in the blockchain 221 may be expressed as being connected based on previous block information included in the hash field. For example, at least one block included in the blockchain 221 may be connected in a DAG structure. According to an embodiment, when at least one block included in the entire ledger of the blockchain network is connected in the DAG structure, the partial ledger of the blockchain network may be connected in a subgraph structure of the entire ledger.

In an embodiment, the state database 222 may store, in a key-value format, values changed due to transaction execution in the blockchain network. In an embodiment, data stored in the state database 222 may be expressed as state data. State data, for example, may refer to data stored in a world state that is a database used in the Hyperledger Fabric. However, the state data is not limited thereto.

The state database 222 is a type of database used in the Hyperledger Fabric, and may store, in the key-value format, final values changed due to execution of a transaction. Accordingly, the electronic device 100 may check the state database 222 in order to identify final values due to execution of a transaction in the blockchain network. State data stored in the state database may have the same characteristic as that of a global variable within the blockchain network.

According to an embodiment, the state database 222 may store data for a transaction involving a user of the electronic device 100. For example, values changed due to execution of a transaction related to the electronic device 100 in the blockchain network may be stored.

According to an embodiment, the transaction consensus module 240 may control an operation for the electronic device 100 to process a transaction consensus in the blockchain network. For example, the transaction consensus module 240 may process a transaction consensus, based on a consensus algorithm used in the blockchain network. The transaction consensus module 240 may support various consensus algorithms used in a typical blockchain. For example, the transaction consensus module 240 may perform transaction consensus with nodes included in the blockchain network, based on proof of work (POW), proof of state (POS), practical byzantine fault tolerance (PBFT), and reliable, replicated, redundant, and fault-tolerant (RAFT).

According to an embodiment, the blockchain network management module 250 may perform an operation related to a blockchain network in which the electronic device 100 participates as a node. According to an embodiment, the blockchain network management module 250 may establish a blockchain network and perform operations related to other nodes (external devices) included in the blockchain network.

Figure 3:
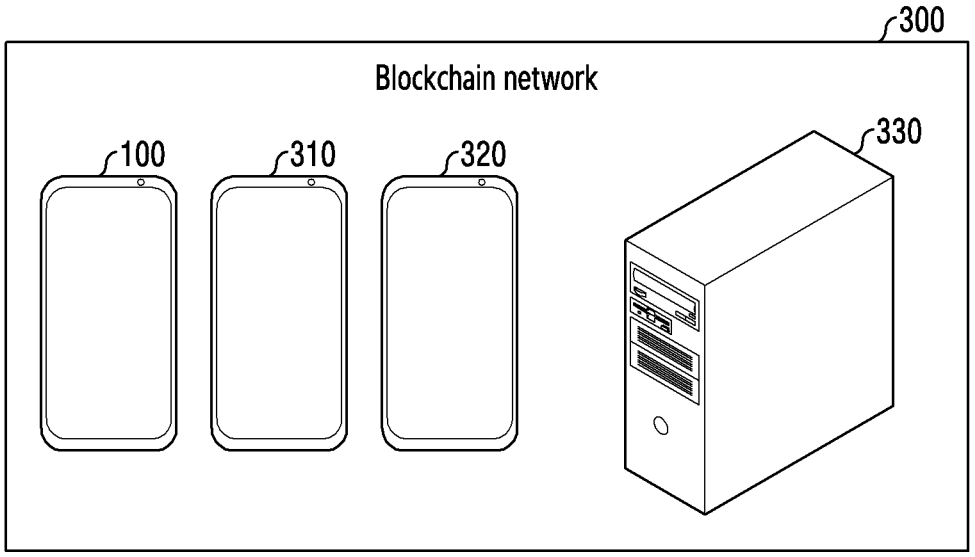
FIG. 3 is a diagram for illustrating a blockchain network according to an embodiment of the disclosure.

FIG. 3 is a diagram for illustrating a blockchain network according to an embodiment of the disclosure.

Referring to FIG. 3, multiple electronic devices 100, 310, 320, and 330 may constitute a blockchain network 300. The multiple electronic devices 100, 310, 320, and 330 constituting the blockchain network 300 may include a portable electronic device. For example, the multiple electronic devices 100, 310, 320, and 330 may correspond to a mobile device, a tablet PC, and/or a laptop computer. According to an embodiment, the electronic device 100, the first electronic device 310, and the second electronic device 320 may be portable mobile nodes, and the third electronic device 330 may be a server node. According to various embodiments, the blockchain network 300 may include multiple server nodes similar to the third electronic device 330.

According to an embodiment, the multiple electronic devices 100, 310, 320, and 330 may include elements similar to those of the electronic device 100. For example, the multiple electronic devices 100, 310, 320, and 330 may include elements similar to those of the blockchain platform 200, as elements for performing operations in the blockchain network, wherein respective elements are communicable to each other.

According to the disclosure, for convenience of description, it has been described that four electronic devices constitute a blockchain network, but the disclosure is not limited thereto.

In an embodiment, the third electronic device 330 may be a server node. The third electronic device 330 serving as a server node may store the entire ledger of the blockchain network 300. According to an embodiment, the third electronic device 330 may perform consensus for all transactions and record all blocks in the blockchain network 300. For example, the third electronic device 330 may participate in all transaction consensus and may store, in a memory, state data and blocks of all transactions of the blockchain network 300. Accordingly, the third electronic device 330 may store, in the memory, the entire ledger that is a distributed ledger of the blockchain network 300.

In an embodiment, the electronic device 100, the first electronic device 310, and/or the second electronic device 320 may be mobile nodes of the blockchain network 300. According to an embodiment, the electronic device 100, the first electronic device 310, and/or the second electronic device 320, which serve as mobile nodes, may generate a transaction and record the same in a block, the transaction being related to respective devices from among all transactions of the blockchain network 300. For example, the electronic device 100, the first electronic device 310, and/or the second electronic device 320 may participate in a transaction consensus related to respective devices, and may store only blocks and state data of transactions related to the respective devices in the memories of the devices, respectively. For example, the electronic device 100 may participate in a consensus of a transaction related to the electronic device 100 and/or a user of the electronic device 100 and may store, in the memory 110, only a block and state data of the transaction. Therefore, the electronic device 100, the first electronic device 310, and/or the second electronic device 320 may store, in the memories of the respective devices, partial ledgers of the entire ledger of the blockchain network 300, wherein the partial ledger store only blocks and state data of transactions in which the electronic device 100, the first electronic device 310, and/or the second electronic device 320 have participated, respectively.

According to an embodiment, the electronic device 100, the first electronic device 310, and/or the second electronic device 320 may participate only in consensus of transactions involving users of the devices, and may store data obtained by transaction execution in the state databases, respectively. For example, the electronic device 100 may participate only in a consensus of a transaction involving the user of the electronic device 100 and may store, in the state database 222, data obtained by execution of the transaction.

According to an embodiment, the multiple electronic devices 100, 310, 320, and 330 may independently execute a smart contract for transaction execution. In an embodiment, a smart contract may execute an identical program logic to process a transaction. Nodes included in the blockchain network 300 according to an embodiment may be configured to participate only in execution of transactions related to respective devices. For example, the electronic device 100, the first electronic device 310, and/or the second electronic device 320, which correspond to mobile nodes, may participate only in execution of transactions associated with the respective devices. In contrast, a server node may participate in execution of all transactions.

In an embodiment, in order to execute a smart contract, the multiple electronic devices 100, 310, 320, and 330 may refer to state data stored in the state database included in at least one of the multiple electronic devices 100, 310, 320, and 330. According to an embodiment, each of the multiple electronic devices 100, 310, 320, and 330 may execute the smart contracts, based on the state data, and whether to execute a transaction may be determined based on a result of consensus processing performed between each of the multiple electronic devices 100, 310, 320, and 330. For example, if result values generated by executing the smart contract by the respective multiple electronic devices 100, 310, 320, and 330 match, it may be determined that the consensus has been successful. A block for a transaction may be generated via consensus performed between devices related to execution of the transaction from among the multiple electronic devices 100, 310, 320, and 330. According to an embodiment, the generated block may be added to a blockchain of a distributed ledger stored in each of the devices related to the transaction execution. For example, the added block may be connected as a block subsequent to an end block of the blockchain of the distributed ledger.

According to an embodiment, a key value stored in the state database of each of the devices related to the transaction execution from among the multiple electronic devices 100, 310, 320, and 330 may be updated by the transaction execution. Nodes of the blockchain network 300 according to an embodiment participate only in execution of the transactions related to the respective devices, and thus state data for the transactions related to the respective devices may be stored. Accordingly, the nodes of the blockchain network 300 may update state data when transactions related to the respective devices are executed, without the need to update the state databases according to execution of all transactions.

The distributed ledger of the blockchain network 300 according to an embodiment may have a structure similar to that of the distributed ledger 220 described with reference to FIG. 2. According to an embodiment, the distributed ledger of the blockchain network 300 may include a blockchain and a state database. As the blockchain network 300 executes a transaction, the blockchain may include at least one block including block data for the transaction and a hash field including previous block information in the entire ledger and previous block information in a partial ledger.

According to an embodiment, each of all blockchain nodes included in the blockchain network 300 may own the entire ledger or a partial ledger. According to an embodiment, at least one block included in each of the entire ledger and the partial ledger may be connected using a hash field. Therefore, if the connection via the hash field is broken or a different distributed ledger is found, the blockchain nodes may doubt the reliability and validity of the corresponding block.

FIG. 4 is a flowchart 400 illustrating an operation of adding a block to a partial ledger by the electronic device according to an embodiment of the disclosure.

Referring to FIG. 4, the electronic device 100 according to an embodiment may execute a smart contract, based on a transaction execution request in operation 401. According to an embodiment, the electronic device 100 may execute the smart contract 210 included in the blockchain platform 200 in response to a transaction execution request. According to various embodiments, the electronic device 100 may be a node that requests transaction generation in the blockchain network 300, and may be a node that performs consensus operation on a transaction in response to the request for transaction generation.

According to an embodiment, in operation 403, as the transaction is executed, the electronic device 100 may generate a block including block data for the transaction and a hash field including previous block information in the entire ledger and previous block information in a partial ledger of the blockchain network. According to an embodiment, the electronic device 100 may execute only a transaction involving a user, and may generate a block for a transaction related to the electronic device 100. According to an embodiment, generation of the block may be expressed as block confirmation or block synchronization. According to an embodiment, confirmation of the block may be determined by consensus between external electronic devices (e.g., the first to third electronic devices 310 to 330) and the electronic device 100 included in the blockchain network 300 including the electronic device 100.

According to an embodiment, in operation 405, the electronic device 100 may store the generated block in association with the partial ledger stored in the memory 110. For example, the generated block may be stored as a last node in the blockchain 221 stored in the distributed ledger 220 of the electronic device 100.

FIG. 5 is a flowchart 500 illustrating an operation of confirming a block via a consensus with nodes included in a blockchain network by the electronic device according to an embodiment of the disclosure.

Referring to FIG. 5, in operation 501, if a transaction requested to be generated in a blockchain network is related to the electronic device 100, the electronic device 100 may acquire a transaction-related request together with all server nodes included in the blockchain network. For example, when generation of a transaction involving a user of the electronic device 100 is requested, the electronic device 100 may acquire a transaction guarantee request or a transaction execution request. Alternatively, when data related to transaction execution is stored in the memory 110 of the electronic device 100, for example, when data to be used for transaction execution is stored in the memory 110 of the electronic device 100, the electronic device 100 may acquire a transaction guarantee request or a transaction execution request.

According to an embodiment, in operation 503, based on having, in the memory, at least a part of data to be used to execute a smart contract for processing the transaction, the electronic device 100 may participate in a consensus for the transaction. For example, the electronic device 100 may participate in the consensus when the transaction is to be executed by referring to data stored in the state database 222, instead of participating in a consensus for all transactions executed in the blockchain network. According to an embodiment, the electronic device 100 may participate in the consensus of the transaction related to the electronic device 100.

According to an embodiment, in operation 505, if data that is not stored in the memory 110 is present among data to be used to execute the smart contract, the electronic device 100 may acquire the data from another device in the blockchain network. For example, while executing the smart contract for processing the transaction, the electronic device 100 may perform execution by referring to the required data in the state database 222. In this case, when data that is not stored in the state database 222 is to be referred to, the electronic device 100 may acquire data from another external device in the blockchain network. For example, the electronic device 100 may acquire data from a server node (e.g., the third electronic device 330 of FIG. 3) among external devices included in the blockchain network. Alternatively, the electronic device 100 may request and acquire, from the server node, a data ownership list indicating other external devices having the data, and may acquire the data from another electronic device, based on the data ownership list.

According to an embodiment, when multiple pieces of data are acquired from multiple external devices in the blockchain network, the electronic device 100 may equally acquire the data from the respective external devices. For example, the electronic device 100 may perform scheduling to acquire data from external devices. The electronic device 100 may perform scheduling in a round robin manner and may acquire data from external devices. For example, the electronic device 100 may require a total of three different types of data for execution of the smart contract, and there may be a case in which each of three external devices has all the three pieces of data. The electronic device 100 may acquire one piece of data from each of the three external devices including three pieces of data, instead of acquiring all the three pieces of data from one external device. However, the disclosure is not limited thereto, and data may be acquired from external devices via various methods.

According to an embodiment, in operation 507, based on the consensus on the transaction, the electronic device 100 may confirm a block including block data for the transaction and a hash field including previous block information in the entire ledger and previous block information in a partial ledger of the blockchain network. According to an embodiment, the electronic device 100 may perform consensus on the transaction with other blockchain nodes (e.g., the first to third electronic devices 310 to 330 of FIG. 3) included in the blockchain network, and may confirm the block based on the consensus. The consensus may be performed with a server node and nodes related to the transaction from among external devices (other nodes) included in the blockchain network of an embodiment. According to an embodiment, the electronic device 100 may perform the consensus with a server node and nodes related to the transaction without having to perform consensus with all nodes of the blockchain network.

According to an embodiment, the block determined by the electronic device 100 may include the block data for the transaction and the hash field including previous block information in the entire ledger and previous block information in the partial ledger. Therefore, even if all nodes in the blockchain network do not participate in consensus, the integrity and reliability of the system may be guaranteed.

Figure 6:
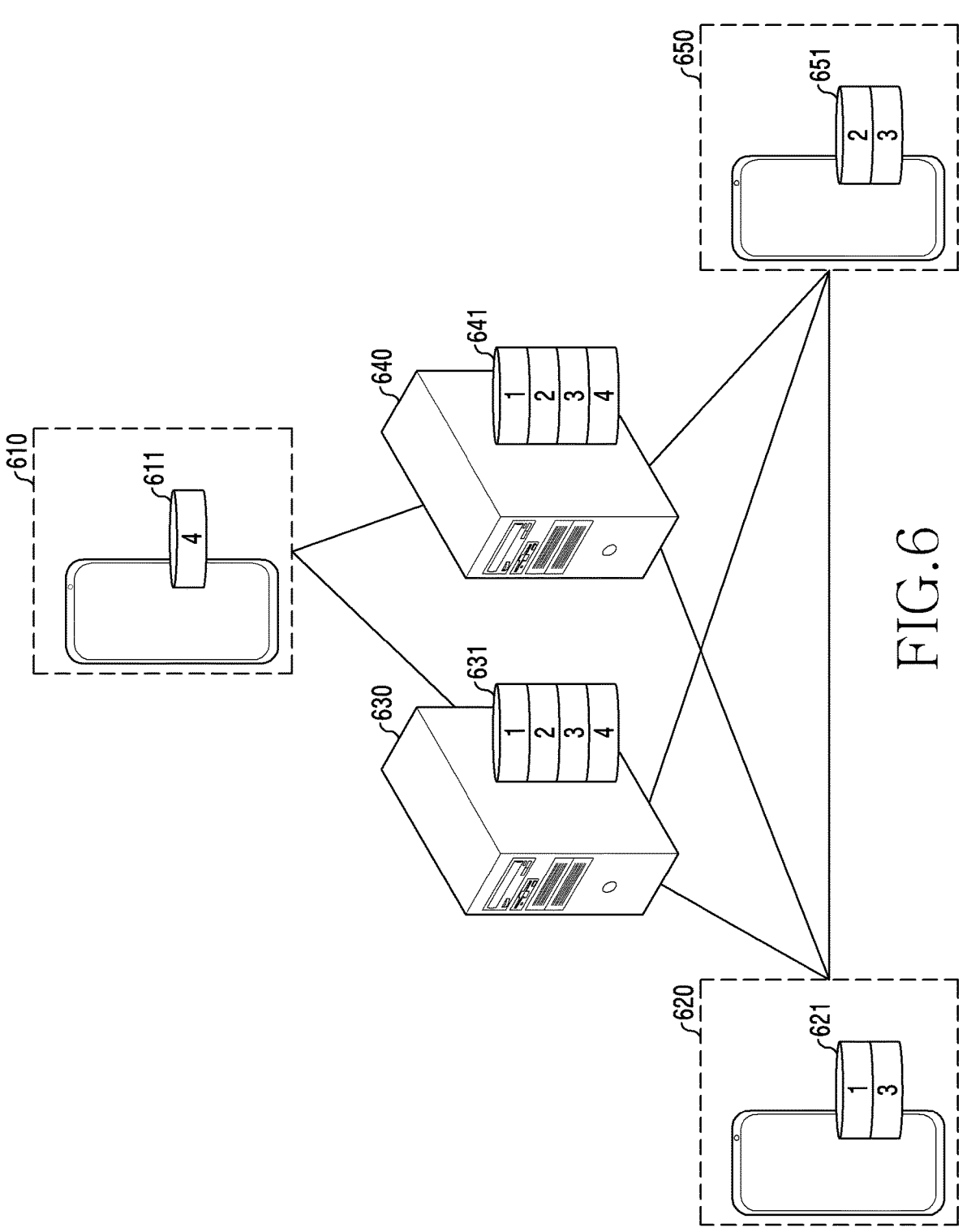
FIG. 6 is a diagram for illustrating a blockchain network including blockchain nodes storing a partial ledger or the entire ledger, according to an embodiment of the disclosure.

FIG. 6 is a diagram for illustrating a blockchain network including blockchain nodes storing a partial ledger or the entire ledger, according to an embodiment of the disclosure.

Referring to FIG. 6, a blockchain network (e.g., the blockchain network 300 of FIG. 3) may include multiple electronic devices as blockchain nodes constituting the blockchain network. For example, the blockchain network may include, as blockchain nodes, a first node 610, a second node 620, a third node 630, a fourth node 640, and/or a fifth node 650. According to an embodiment, the first to fifth nodes 610 to 650 may include elements similar to those of the electronic device 100. For example, the first to fifth nodes 610 to 650 may include elements configured to perform an operation similar to that of the blockchain platform 200.

According to an embodiment, the first node 610, the second node 620, and the fifth node 650 may be configured as mobile nodes. The third node 630 and the fourth node 640 may be configured as server nodes. According to an embodiment, the first node 610, the second node 620, and the fifth node 650 may represent portable electronic devices. For example, the first node 610, the second node 620, and the fifth node 650 may correspond to a mobile device, a tablet PC, and/or a laptop computer. According to an embodiment, the third node 630 and the fourth node 640 are server nodes and may be electronic devices having a large memory capacity compared to the first node 610, the second node 620, and the fifth node 650.

According to an embodiment, the first to fifth nodes 610 to 650 included in the blockchain network may communicate with each other. Accordingly, the first to fifth nodes 610 to 650 may perform an operation for transaction execution by using a communication circuit (e.g., the communication circuit 120 of FIG. 1) included in each device.

According to an embodiment, blocks generated in the blockchain network may be included in the distributed ledger described with reference to FIGS. 2 and 3. For example, when the first to fourth blocks are generated in the blockchain network, the distributed ledger may include the first to fourth blocks. According to an embodiment, the first to fourth blocks may be generated based on execution of a first transaction to a fourth transaction, respectively. According to various embodiments, each of the first to fourth blocks may be generated based on execution of at least one transaction.

According to an embodiment, at least one block included in the distributed ledger may have a configuration similar to that of the block described with reference to FIGS. 2 and 3. For example, the block may include a hash field including previous block information and block data including transaction data of the block. According to an embodiment, at least one block included in the distributed ledger of the blockchain network may be connected in a DAG structure, based on the previous block information included in the hash field. Configurations and connection structures of the first to fourth blocks will be described later with reference to FIGS. 7 and 8.

According to an embodiment, each of the first to fifth nodes 610 to 650 may include at least a part of the distributed ledger of the blockchain network. For example, each of the first node 610, the second node 620, and the fifth node 650 may store, in a memory (e.g., the memory 110 of FIG. 1), a partial ledger including a part of the entire ledger of the blockchain network. For example, the third node 630 and the fourth node 640 may store the entire ledger of the blockchain network in the memory.

According to an embodiment, the nodes storing the partial ledger may store the partial ledger including blocks for transactions related to the respective nodes. According to an embodiment, whether transactions are related to the respective nodes may be determined according to whether data to be used for execution of the transactions are stored in the memories of the respective nodes, whether users of the respective nodes have requested generation of the transactions, and/or whether the users have participated in consensus based on the transactions. For example, based on the determination, the first node 610 may be involved in the fourth transaction. The second node 620 may be involved in the first transaction and the third transaction. The fifth node 650 may be involved in the second transaction and the third transaction.

According to an embodiment, server nodes of the blockchain network may be determined to be related to all transactions executed in the blockchain network. In an embodiment, the server nodes may participate in a consensus for all transactions in the blockchain network. Accordingly, each of the third node 630 and the fourth node 640 may be involved in the first to fourth transactions.

According to an embodiment, the first to fifth nodes 610 to 650 included in the blockchain network may include state databases configured to store data on transactions related to the respective nodes and blocks based on the transactions related to the respective nodes. For example, the first to fifth nodes 610 to 650 may store, in the respective memories, the blockchain including the blocks and the ledger including state databases.

For example, the first node 610 may store, in the memory, a first partial ledger 611 including data for the fourth transaction and the fourth block based on the fourth transaction. For example, the second node 620 may include the first block and third block generated based on the first transaction and third transaction, respectively, and may store, in the memory, a second partial ledger 621 including data for the first transaction and third transaction. For example, the third node 630 and the fourth node 640 are server nodes, and may participate in a block consensus for execution of all transactions in the blockchain network. Accordingly, the third node 630 may include the first to fourth blocks generated based on the respective first to fourth transactions, and may store, in the memory, a third entire ledger 631 including the state database of the blockchain network. Accordingly, the fourth node 640 may include the first to fourth blocks generated based on the respective first to fourth transactions, and may store, in the memory, a fourth entire ledger 641 including the state database of the blockchain network. According to an embodiment, each of the third entire ledger 631 and the fourth entire ledger 641 may correspond to the distributed ledger of the blockchain network. Accordingly, the third node 630 and the fourth node 640 may store the identical entire ledger. For example, the fifth node 650 may include the second block and third block generated based on the second transaction and third transaction, respectively, and may store, in the memory, a fifth partial ledger 651 including data for the second transaction and third transaction.

Figure 7:
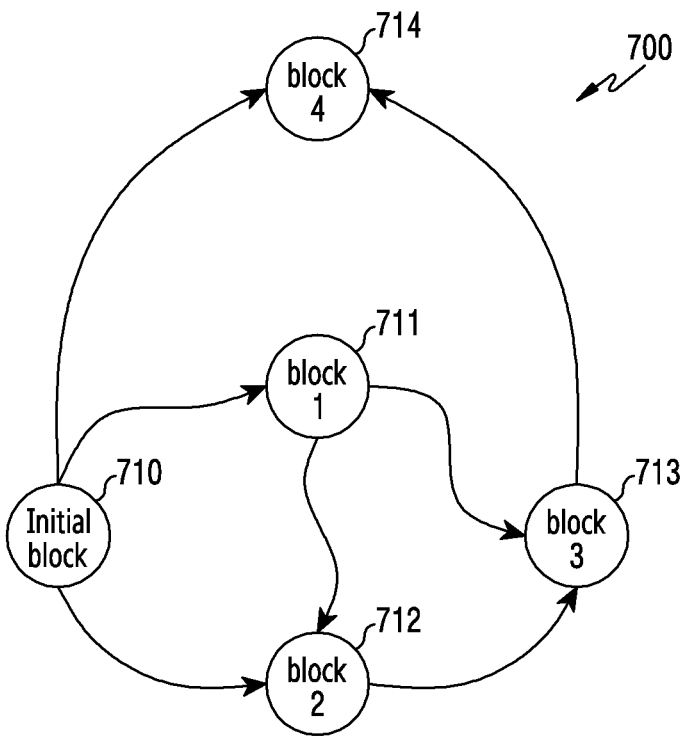
FIG. 7 is a diagram for illustrating a graph structure of blocks included in the entire ledger according to an embodiment of the disclosure.

FIG. 7 is a diagram for illustrating a graph structure of blocks included in the entire ledger according to an embodiment of the disclosure.

Referring to FIG. 7, a connection structure of blocks included in the distributed ledger of the blockchain network described with reference to FIG. 6 is illustrated. A distributed ledger 700 of a blockchain network may include an initial block 710 and a first to a fourth block 711 to 714. According to an embodiment, a block for a transaction related to generation of the blockchain network may be included as the initial block 710 among blocks included in the blockchain of the ledger. The initial block among the blocks included in the blockchain may be expressed as a genesis block of the blockchain. In an embodiment, the initial block 710 may correspond to a root node. For example, the genesis block may be included as an initial block in the entire ledger and a partial ledger. According to an embodiment, the first to fourth blocks 711 to 714 may be blocks generated based on the first to fourth transactions, respectively.

According to an embodiment, the distributed ledger 700 may include the initial block 710 and the first to fourth blocks 711 to 714 by connecting the same in a DAG structure. For example, each of the initial block 710 and the first to fourth blocks 711 to 714 may correspond to a node of the DAG graph. According to an embodiment, the connection structure of the initial block 710 and the first to fourth blocks 711 to 714 may be formed based on information of a hash field included in each block. According to an embodiment, each block may include a block hash including information on the block. For example, the initial block 710 may include an initial block hash representing the initial block 710. The hash field included in each block may include a block hash indicating previous block information in the entire ledger and a block hash indicating previous block information in a partial ledger. For example, at least one block connected by using the initial block 710 as a previous block in the entire ledger or a partial ledger may include hash information of the initial block 710 in the hash field. Therefore, the entire ledger or the partial ledger may have a structure in which a connection is made to a hash field of a subsequent block by using a block hash included in a corresponding block.

According to an embodiment, as a subsequent block including hash information included in a previous block is generated, the previous block and the subsequent block may be connected. Accordingly, a connection using hash information may be expressed as being connected toward another block according to the directed acyclic graph.

According to an embodiment, the initial block 710 is a genesis block corresponding to a root node, and the initial block 710 may be connected toward the fourth block 714, the first block 711, and the second block 712. For example, each of the first block 711, the second block 712, and the fourth block 714 may include hash information of the initial block 710, as information on a previous block. According to an embodiment, the first block 711 may be connected toward the third block 713 and the second block 712. For example, each of the third block 713 and the second block 712 may include hash information of the first block 711. According to an embodiment, the second block 712 may be connected toward the third block 713. For example, the third block 713 may include hash information of the second block 712. According to an embodiment, the third block 713 may be connected toward the fourth block 714. For example, the fourth block 714 may include hash information of the third block 713.

According to an embodiment, each of the nodes included in the blockchain network may store at least a part of the distributed ledger 700 in a memory. For example, a server node (e.g., the third node 630 and the fourth node 640) may store the entire distributed ledger 700 in a memory. For example, a mobile node (e.g., the first node 610, the second node 620, and the fifth node 650) may store a part of the distributed ledger 700 in a memory. In this case, the mobile node may store a part of the distributed ledger 700 in the memory in a sub-graph structure. The mobile node may store in the memory a partial ledger including only blocks for transactions related to the mobile node.

Figure 8:
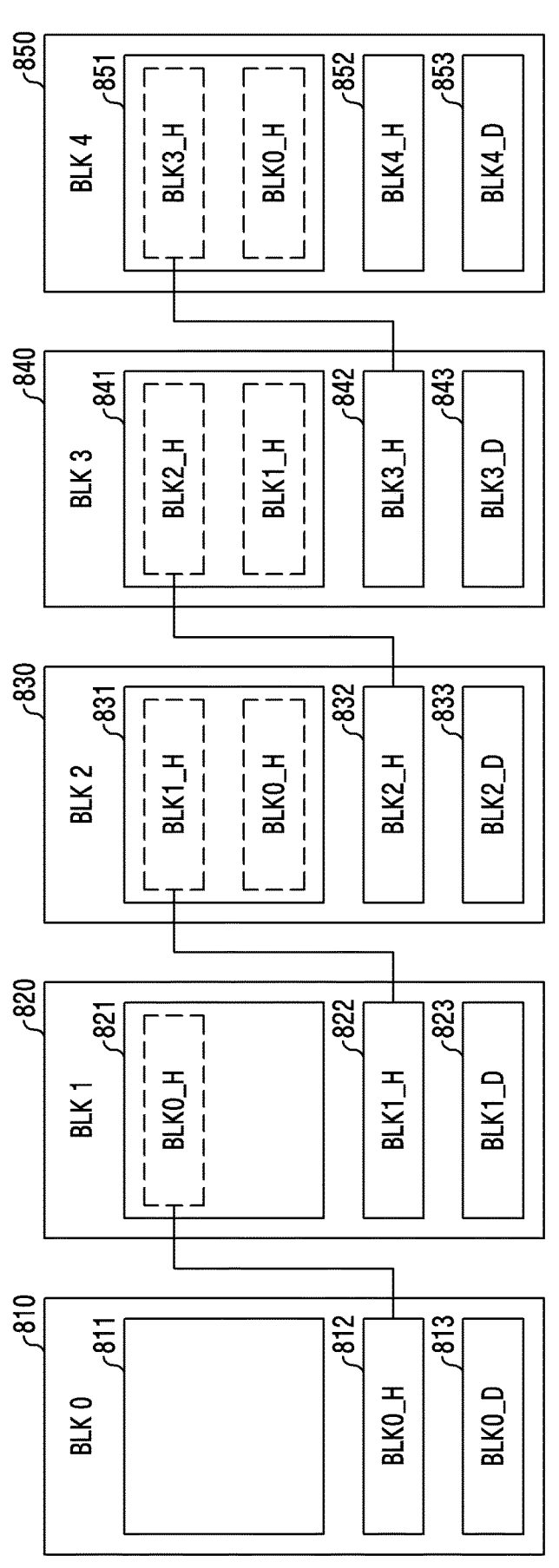
FIG. 8 is a diagram for illustrating a structure of the entire ledger stored in a server node according to an embodiment of the disclosure.

FIG. 8 is a diagram for illustrating a structure of the entire ledger stored in a server node according to an embodiment of the disclosure.

Referring to FIG. 8, a server node (e.g., the third node 630 and the fourth node 640) may store, in a memory, the entire ledger corresponding to a distributed ledger of a blockchain network. According to an embodiment, each of the third node 630 and the fourth node 640 which are server nodes included in the blockchain network described with reference to FIG. 6 may store, in the memory, a distributed ledger including an initial block 810 and a first to a fourth block 820 to 850. In an embodiment, the entire ledger may represent the entire ledger for the blockchain network described with reference to FIG. 6.

According to an embodiment, in at least one block included in the distributed ledger, for example, each of the initial block 810 and the first to fourth block 820 to 850 may include block data and a hash filed including previous block information and block information of each corresponding block. According to an embodiment, the previous block information may include previous block information in the entire ledger and previous block information in a partial ledger in the blockchain network. According to various embodiments, the block information of a corresponding block may include various information without limitation as long as information is a block-specific value capable of representing the block. For example, the block information may indicate hash information of a block, which is a block-specific value.

According to an embodiment, the initial block 810 is based on a transaction related to generation of the blockchain network, and may represent a genesis block. The initial block 810 according to an embodiment is an initial block generated in the blockchain network, and may not include previous block information in an initial block hash field 811. The initial block 810 may include an initial block hash 812 and initial block data 813 which include information of the block. The initial block data 813 may include transaction data related to generation of the blockchain network.

According to an embodiment, the first block 820 may be a block generated based on the first transaction executed in the blockchain network described with reference to FIG. 6. According to an embodiment, the first block 820 may include, in a first hash field 821, the initial block hash 812 indicating previous block information in the entire ledger. The first block 820 may include a first block hash 822 and first block data 823 which include information of the block. According to an embodiment, the first block data 823 may include first transaction data.

According to an embodiment, the second block 830 may be a block generated based on the second transaction executed in the blockchain network described with reference to FIG. 6. According to an embodiment, the second block 830 may include, in a second hash field 831, the first block hash 822 indicating previous block information in the entire ledger and the initial block hash 812 indicating previous block information in a partial ledger. The second block 830 may include a second block hash 832 and second block data 833 which include information of the block. According to an embodiment, the second block data 833 may include second transaction data.

According to an embodiment, the third block 840 may be a block generated based on the third transaction executed in the blockchain network described with reference to FIG. 6. According to an embodiment, a third hash field 841 of the third block 840 may include the second block hash 832 indicating previous block information in the entire ledger and the first block hash 822 indicating previous block information in a partial ledger. The third block 840 may include a third block hash 842 and third block data 843 which include information of the block. According to an embodiment, the third block data 843 may include third transaction data.

According to an embodiment, the fourth block 850 may be a block generated based on the fourth transaction executed in the blockchain network described with reference to FIG. 6. According to an embodiment, a fourth hash field 851 of the fourth block 850 may include the third block hash 842 indicating previous block information in the entire ledger and the initial block hash 812 indicating previous block information in a partial ledger. The fourth block 850 may include a fourth block hash 852 and fourth block data 853 which include information of the block. According to an embodiment, the fourth block data 853 may include fourth transaction data.

Figure 9A:
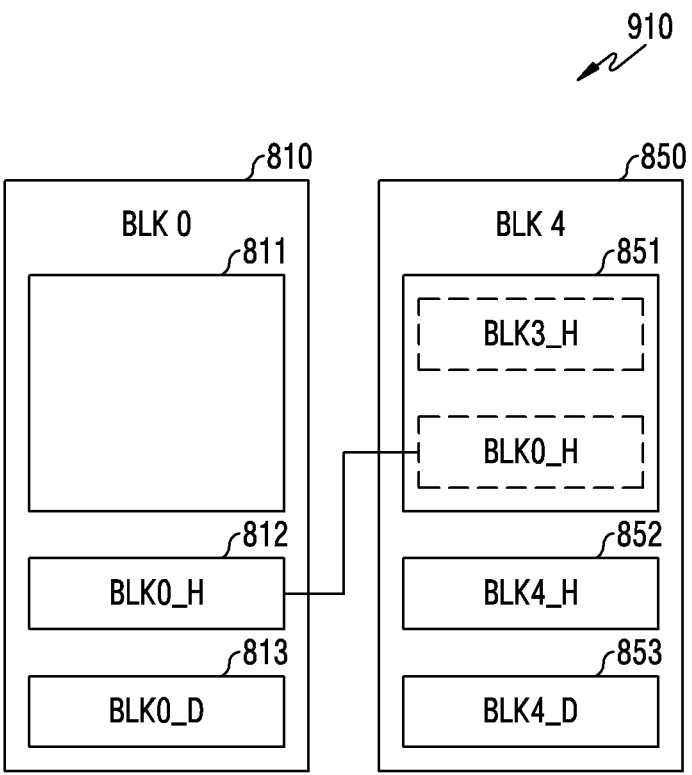
FIG. 9A a diagram for illustrating a structure of a partial ledger stored in a first node according to an embodiment of the disclosure.
Figure 9B:
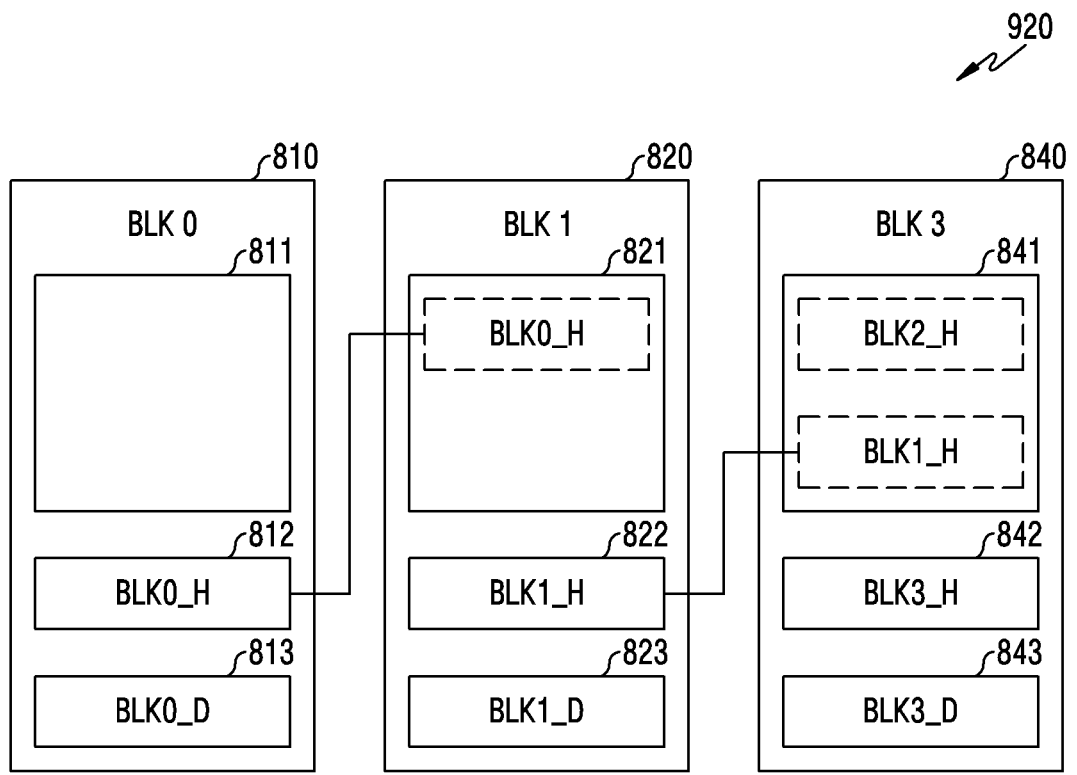
FIG. 9B is a diagram for illustrating a structure of a partial ledger stored in a second node according to an embodiment of the disclosure.
Figure 9C:
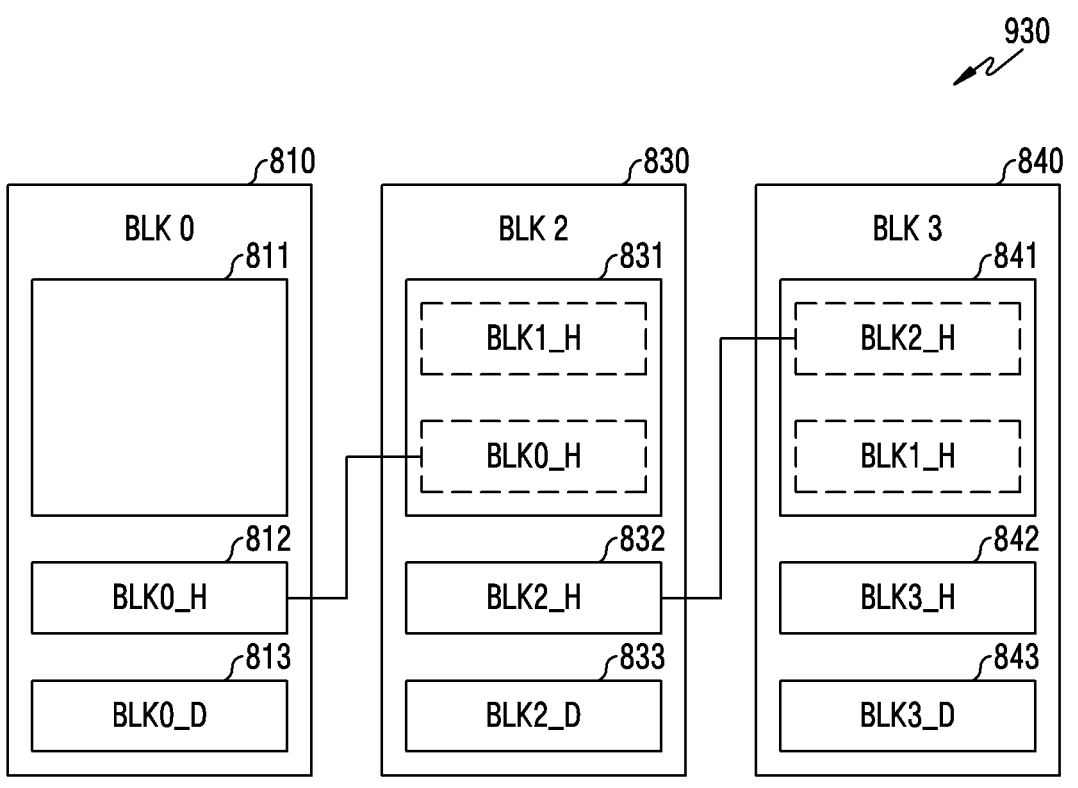
FIG. 9C a diagram for illustrating a structure of a partial ledger stored in a fifth node according to an embodiment of the disclosure.

FIG. 9A a diagram for illustrating a structure of a partial ledger stored in a first node according to an embodiment of the disclosure. FIG. 9B is a diagram for illustrating a structure of a partial ledger stored in a second node according to an embodiment of the disclosure. FIG. 9C a diagram for illustrating a structure of a partial ledger stored in a fifth node according to an embodiment of the disclosure.

According to an embodiment, each of nodes included in a blockchain network may include at least a part of a distributed ledger of the blockchain network. Nodes in the blockchain network may store, in memories, partial ledgers including blocks for transactions related to the respective nodes. The nodes of the blockchain network may include state databases (e.g., the state database 222 described with reference to FIG. 2), and the state databases may store state data related to transactions related to the respective nodes.

According to an embodiment, the first node 610 of the blockchain network described with reference to FIG. 6 may store a first partial ledger 910. According to an embodiment, the first node 610 may be related to the fourth transaction. Accordingly, the first node 610 may store, in the memory, the first partial ledger 910 including the initial block 810 and the fourth block 850. According to an embodiment, the first node 610 may store, in the state database, state data related to the transaction for each of the initial block 810 and the fourth block 850. According to an embodiment, the fourth block 850 may include, in the fourth hash field 851, the initial block hash 812 indicating previous block information in the first partial ledger 910. Accordingly, the initial block 810 and the fourth block 850 included in the first partial ledger 910 may be connected. Since the first node 610 includes the initial block hash 812, the reliability and integrity of the blocks may be secured only with the first partial ledger 910 instead of the entire ledger.

According to an embodiment, the second node 620 of the blockchain network described with reference to FIG. 6 may store a second partial ledger 920. According to an embodiment, the second node 620 may be involved in the first transaction and the third transaction. Accordingly, the second node 620 may store, in the memory, the second partial ledger 920 including the initial block 810, the first block 820 and the third block 840. According to an embodiment, the second node 620 may store, in the state database, state data related to the transaction for each of the initial block 810, the first block 820, and the third block 840.

According to an embodiment, the third block 840 may include, in the third hash field 841, the first block hash 822 indicating previous block information in the second partial ledger 920. Accordingly, the third hash field 841 may include the first block hash 822 indicating previous block information in the second partial ledger 920 and the second block hash 832 indicating previous block information in the entire ledger described with reference to FIG. 8. According to an embodiment, the second block 830 may be generated via consensus of blockchain nodes (e.g., the third to fifth nodes 630 to 650 of FIG. 6) included in the blockchain network before generation of the third block 840. In an embodiment, the third block 840 generated after generation of the second block 830 may be connected to the second block 830 via the second block hash 832.

According to an embodiment, based on the third hash field 841, the initial block 810, the first block 820, and the third block 840 included in the second partial ledger 920 may be connected. Even if the second node 620 stores the second partial ledger 920 instead of the entire ledger in the memory, the reliability and integrity of the blocks may be secured.

According to an embodiment, the fifth node 650 of the blockchain network described with reference to FIG. 6 may store a third partial ledger 930. According to an embodiment, the fifth node 650 may be involved in the second transaction and the third transaction. Accordingly, the fifth node 650 may store, in the memory, the third partial ledger 930 including the initial block 810, the second block 830, and the third block 840. According to an embodiment, the fifth node 650 may store, in the state database, state data related to the transaction for each of the initial block 810, the second block 830, and the third block 840. According to an embodiment, the second block 830 may include, in the hash field, the initial block hash 812 indicating previous block information in the third partial ledger 930. Accordingly, the initial block 810, the second block 830, and the third block 840 included in the third partial ledger 930 may be connected. Even if the fifth node 650 stores the third partial ledger 930 instead of the entire ledger in the memory, the reliability and integrity of the blocks may be secured.

Figure 10:
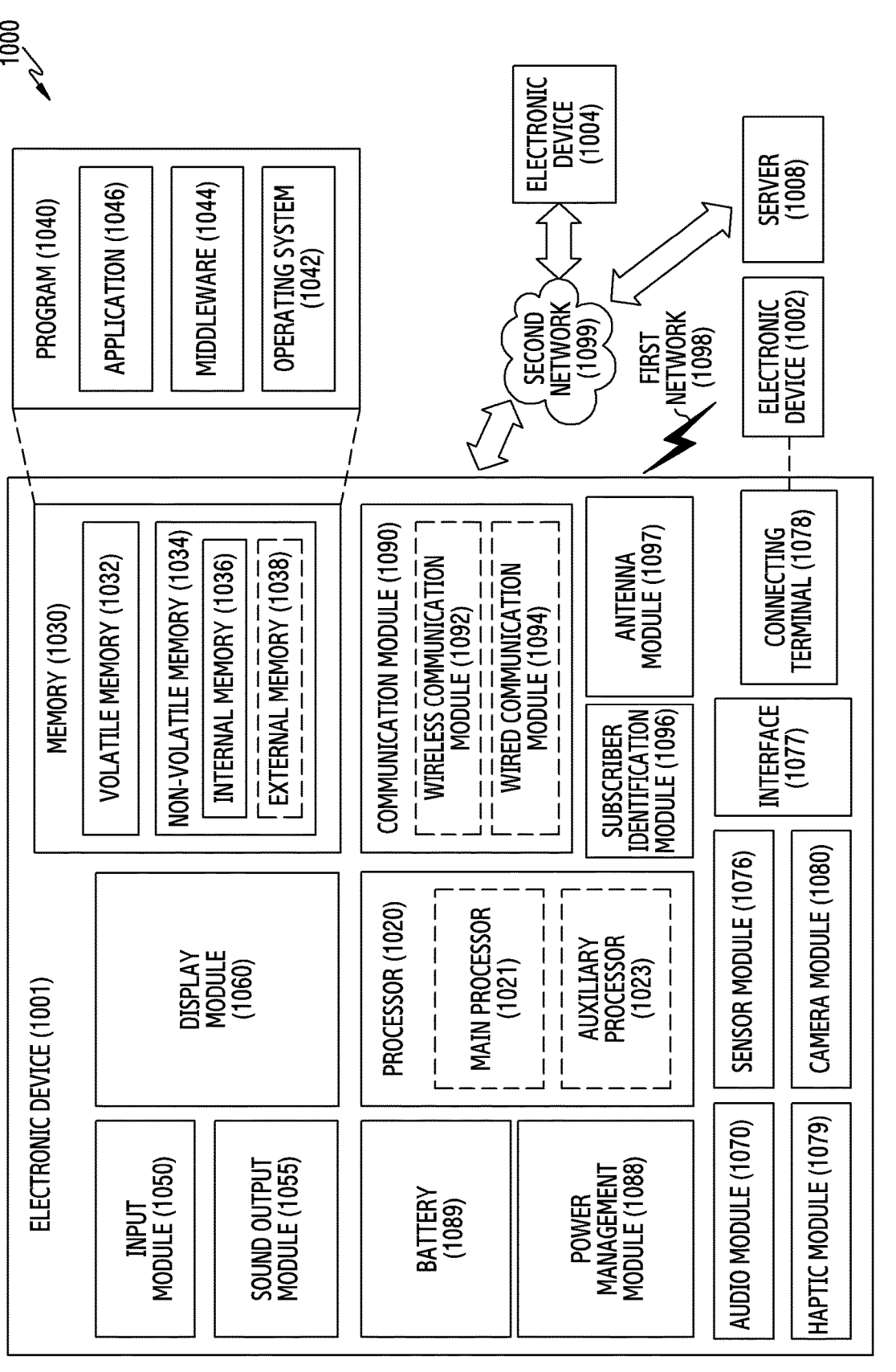
FIG. 10 is a block diagram of an electronic device in a network environment according to an embodiment of the disclosure.

FIG. 10 is a block diagram illustrating an electronic device 1001 in a network environment 1000 according to an embodiment of the disclosure.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device constituting a blockchain node of a blockchain network, the electronic device comprising:

communication circuitry configured to at least one of transmit a signal to or receive another signal from one or more external devices;

memory, comprising one or more storage media, storing instructions and a partial ledger including a part of an entire ledger for the blockchain network, the partial ledger including at least one block corresponding to respective at least one transaction in which the electronic device has participated in a consensus; and at least one processor communicatively coupled to the communication circuitry and the memory, wherein the instructions, when executed by the at least one processor is individually or collectively, cause the electronic device to:

execute a transaction related to the electronic device, and according to the execution of the transaction, generate a block which includes:

block data for the transaction, and a hash field including first previous block information associated with a first block preceding the block in the entire ledger and second previous block information associated with a second block preceding the block in the partial ledger, and store the block in the memory in association with the partial ledger, and wherein the second block is generated via consensus of the blockchain node and other blockchain nodes included in the blockchain network before generation of the block, when the electronic device is associated with a transaction corresponding to the second block as the blockchain node.

2. The electronic device of claim 1, wherein the partial ledger has a directed acyclic graph (DAG) structure, in which the at least one block is included as a node, respectively, and wherein the partial ledger includes, as a root node, an initial block among the at least one block.

3. The electronic device of claim 1, wherein the instructions that, when executed by the at least one processor is-individually or collectively, further cause the electronic device to:

execute a smart contract for the execution of the transaction, reach a consensus with at least one external device associated with the transaction from among one or more external devices respectively constituting blockchain nodes of the blockchain network, based on a consensus algorithm of the blockchain network, and synchronize the block.

4. The electronic device of claim 1, wherein the memory includes a state database for the blockchain network, and wherein the state database is configured to store state data related to the at least one transaction.

5. The electronic device of claim 4, wherein the instructions that, when executed by the at least one processor individually or collectively, further cause the electronic device to:

determine whether data to be used for the execution of the transaction is stored in the state database, and based on a result of the determination, acquire the data to be used for the execution of the transaction from at least one external device constituting a blockchain node in the blockchain network via the communication circuitry.

6. The electronic device of claim 4, wherein the instructions that, when executed by the at least one processor individually or collectively, further cause the electronic device to:

determine whether data to be used for the execution of the transaction is stored in the state database, and based on a result of the determination, if the data to be used for the execution of the transaction is acquired from each of multiple external devices via the communication circuitry, acquire the data in a round robin manner from each of the multiple external devices.

7. The electronic device of claim 4, wherein the instructions that, when executed by the at least one processor individually or collectively, further cause the electronic device to:

update the state database based on the execution of the transaction.

8. The electronic device of claim 1, wherein the hash field further includes information on the block, and wherein the information on the block includes information based on a generation sequence of the block in the entire ledger.

9. A method performed by an electronic device constituting a blockchain node of a blockchain network, the method comprising:

executing a transaction related to the electronic device;

according to the executing of the transaction, generating a block which includes:

block data for the transaction, and a hash field including first previous block information associated with a first block preceding the block in an entire ledger and second previous block information associated with a second block preceding the block in a partial ledger with respect to the blockchain network; and storing the block in a memory of the electronic device in association with the partial ledger, wherein the partial ledger includes a part of the entire ledger for the blockchain network, wherein the partial ledger includes at least one block corresponding to respective at least one transaction in which the electronic device has participated in a consensus, and wherein the second block is generated via consensus of the blockchain node and other blockchain nodes included in the blockchain network before generation of the block, when the electronic device is associated with a transaction corresponding to the second block as the blockchain node.

10. The method of claim 9, wherein the storing in the memory includes storing in a directed acyclic graph (DAG) structure, in which the at least one block is included as a node, respectively, in association with the partial ledger, and wherein the partial ledger includes, as a root node, an initial block among the at least one block.

11. The method of claim 9, further comprising:

executing a smart contract for the executing of the transaction;

reaching a consensus with at least one external device associated with the transaction from among one or more external devices respectively constituting blockchain nodes of the blockchain network, based on a consensus algorithm of the blockchain network; and synchronizing the block.

12. The method of claim 9, wherein the memory includes a state database for the blockchain network, and wherein the method further comprises storing state data related to the at least one transaction.

13. The method of claim 12, further comprising:

determining whether data to be used for the executing of the transaction is stored in the state database; and based on a result of the determination, acquiring data to be used for the executing of the transaction from at least one external device constituting a blockchain node in the blockchain network.

14. The method of claim 12, further comprising, based on the executing of the transaction, updating the state database.

15. The method of claim 9, wherein the hash field further includes information on the block, and wherein the information on the block includes information based on a generation sequence of the block in the entire ledger.

16. A blockchain system comprising:

a first electronic device as a blockchain node; and a second electronic device as another blockchain node, wherein the first electronic device includes a first memory configured to store a partial ledger including a part of an entire ledger for the blockchain system, wherein the second electronic device includes a second memory configured to store the entire ledger for the blockchain system, wherein the entire ledger includes at least one block generated according to execution of at least one transaction in the blockchain system, wherein the partial ledger includes at least a part of the entire ledger, and wherein each of the at least one block includes:

block data for a transaction, and a hash field including first previous block information associated with a first block preceding the block in the entire ledger and second previous block information associated with a second block preceding the block in a partial ledger, and wherein the second block is generated via consensus of the blockchain node and other blockchain nodes included in a blockchain network before generation of the block, when the electronic device is associated with a transaction corresponding to the second block as the blockchain node.

17. The blockchain system of claim 16, wherein the second electronic device is configured to participate in a consensus for execution of all of the at least one transaction in the blockchain system, and wherein the first electronic device is configured to participate in a consensus for execution of a transaction related to the first electronic device from among the at least one transaction.

18. The blockchain system of claim 17, wherein the first memory of the first electronic device includes a first state database configured to store data for the transaction related to the first electronic device, and wherein the second memory of the second electronic device includes a second state database configured to store data for all of the at least one transaction executed in the blockchain system.

19. The blockchain system of claim 16, wherein the first electronic device is configured to:

determine whether data to be used for the execution of the at least one transaction is stored in the first memory, and based on a result of the determination, acquire data to be used for the execution of the at least one transaction from at least one external device included in the blockchain system.

20. The blockchain system of claim 16, wherein the entire ledger has a directed acyclic graph (DAG) structure, in which the at least one block is included as a node, and wherein the entire ledger includes, as a root node, an initial block of the blockchain system from among the at least one block.

* * * * *